United States Patent
Obi et al.

(10) Patent No.: US 8,149,491 B2
(45) Date of Patent: Apr. 3, 2012

(54) SCANNING UNIT AND IMAGE DISPLAY DEVICE

(75) Inventors: Hiroshi Obi, Nara (JP); Hironori Tomita, Nara (JP); Akira Kurozuka, Osaka (JP); Osamu Kajino, Osaka (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 12/278,297

(22) PCT Filed: Feb. 8, 2007

(86) PCT No.: PCT/JP2007/052256
§ 371 (c)(1),
(2), (4) Date: Aug. 5, 2008

(87) PCT Pub. No.: WO2007/091648
PCT Pub. Date: Aug. 16, 2007

(65) Prior Publication Data
US 2009/0185249 A1 Jul. 23, 2009

(30) Foreign Application Priority Data

Feb. 10, 2006 (JP) .................................. 2006-033366

(51) Int. Cl.
*G02B 26/02* (2006.01)
(52) U.S. Cl. ...................................................... 359/228
(58) Field of Classification Search .... 359/196.1–226.3, 359/237–349, 228, 253, 296, 665, 886
See application file for complete search history.

(56) References Cited

U.S. PATENT DOCUMENTS

| | | | | |
|---|---|---|---|---|
| 5,742,419 A | * | 4/1998 | Dickensheets et al. .... | 359/201.1 |
| 6,002,505 A | * | 12/1999 | Kraenert et al. | |
| 7,123,796 B2 | * | 10/2006 | Steckl et al. ..................... | 385/40 |
| 7,255,780 B2 | * | 8/2007 | Shenderov ..................... | 204/450 |
| 7,324,262 B2 | * | 1/2008 | Kim et al. ..................... | 359/276 |
| 7,394,598 B2 | * | 7/2008 | Hendriks et al. ............. | 359/665 |
| 7,909,974 B2 | * | 3/2011 | Bartels et al. ................. | 204/600 |
| 7,920,317 B2 | * | 4/2011 | Lee et al. ...................... | 359/253 |
| 2004/0165154 A1 | * | 8/2004 | Kobori et al. | |
| 2005/0007562 A1 | * | 1/2005 | Seki et al. | |
| 2005/0024704 A1 | * | 2/2005 | Sakai | |

(Continued)

FOREIGN PATENT DOCUMENTS

JP 2994469 * 10/1999

(Continued)

OTHER PUBLICATIONS

Merriam-Webster's Collegiate Dictionary 481 (11th ed. 2003).*

(Continued)

*Primary Examiner* — Jennifer L. Doak
(74) *Attorney, Agent, or Firm* — Renner, Otto, Boisselle & Sklar, LLP

(57) ABSTRACT

A scan unit according to the present invention is a scan unit including: a reflecting portion for reflecting laser light; and an enclosure portion having a movable object enclosed within a hollow, characterized in that the movable object moves in accordance with an angular velocity of the scan unit, thereby changing a reflecting state of the reflecting portion with respect to the laser light. In one embodiment, the movable object moves in accordance with the angular velocity of the scan unit to cover at least a part of the reflecting portion. In one embodiment, the movable object moves in accordance with the angular velocity of the scan unit to deform the reflecting portion.

11 Claims, 13 Drawing Sheets

U.S. PATENT DOCUMENTS

| | | | |
|---|---|---|---|
| 2005/0243399 A1* | 11/2005 | Kim et al. ................ | 359/253 |
| 2007/0127135 A1* | 6/2007 | Nagasaka ................ | 359/665 |
| 2008/0297880 A1* | 12/2008 | Steckl et al. ............. | 359/291 |
| 2010/0134861 A1* | 6/2010 | Ohishi et al. ............ | 359/228 |
| 2010/0302613 A1* | 12/2010 | Mitsuda et al. .......... | 359/228 |

FOREIGN PATENT DOCUMENTS

| | | | |
|---|---|---|---|
| JP | 2002-341280 | * | 11/2002 |
| JP | 2004-254145 | * | 9/2004 |
| JP | 2004-312347 | * | 11/2004 |
| JP | 2004-333698 | * | 11/2004 |
| JP | 2005-031266 | * | 2/2005 |
| JP | 2007-086266 | * | 4/2007 |

OTHER PUBLICATIONS

International Search Report for corresponding Application No. PCT/JP2007/052256 dated May 15, 2007.*

* cited by examiner (a)

(b)

(a)

(b)

(c)

(a)

(b)

(a)

(b)

SCANNING UNIT AND IMAGE DISPLAY DEVICE

TECHNICAL FIELD

The present invention relates to an image display apparatus for projecting laser light to display an image, and in particular to a technique of improving the safety of an image display apparatus.

BACKGROUND ART

When a human comes into a projection light path between a projector for projecting an image onto a screen and the screen and turns his or her face toward the projecting side, there is a danger in that the projection light may stimulate his or her eyes. Therefore, a method has been proposed in which a detection section for detecting the presence or absence of an object in the projection light path and a control section for controlling radiation power are provided in an image display apparatus, and when an object is detected in the projection light path, the radiation power is reduced to prevent danger.

For example, Patent Document 1 discloses an image display apparatus which monitors a projection region with an electromagnetic radiation sensor, a thermal radiation sensor, a pyroelectric sensor, a temperature sensor, or the like, and when an object exists in the projection region, switches to an operation mode which is made harmless to humans.

Moreover, Patent Document 2 discloses an image display apparatus which monitors a projected image with a camera, extracts a region in which a human is present, and causes any image to be masked in that region. With this apparatus, the radiation power only needs to be limited in the region where human presence is determined within the projection region, thus permitting an image to be still displayed in any other region.

Moreover, an image display apparatus which projects laser light to display an image (also referred to as a laser projector) is under development. Laser light which is output from a laser light-emitting element has a higher color purity than that of light which is output from a lamp, and thus allows for an improved color reproduction. In addition, the optics can be downsized and also the power consumption can be reduced, so that an image display apparatus can be realized which is power-thrifty and small-sized.

Since laser light is available for scanning in a thinly constricted state, a mirror element or the like can be used to perform a two-dimensional scanning with laser light, whereby an image is displayed. Such a scanning-based laser projector displays an image by modulating the intensity of laser light, and thus is even more power-thrifty than any usual projector that uses two-dimensional image displaying devices, e.g., a liquid crystal panel or a DMD (Digital Micromirror Device). Moreover, downsizing of the apparatus can also be achieved because there is no need for illumination optics for uniformly illuminating two-dimensional image devices.

Thus, a scanning-based laser projector is mountable even in a small-sized mobile device. Thus, large-scale displaying can be enjoyed even with a mobile phone or the like, in which a large-sized display would be difficult to be mounted.

In a scanning-based image display apparatus that uses a beam which is thinly constricted by a scanning means such as a mirror device, other than ensuring safety by detecting the presence or absence of an object intruding the projection light path, it is also necessary to provide safety measures in case of an unintentional halting of the mirror ed. Therefore, an approach has been proposed which detects the scan operation of the mirror, and in a state of abnormal scan operation, blocks the laser light or cuts supply of electric power to the laser light source.

For example, in Patent Document 3, the mirror is halted and retained at a predetermined position when the scan operation of the mirror is not normal, e.g., in the case where the scan operation is completely halted, or where the period is not constant and the speed is not as predetermined. At this time, the laser light is allowed to be radiated onto a light shielding portion so as not to be radiated outside the image display apparatus, thus being blocked from going outside.

In Patent Document 4, electric power is supplied in synchronization with the pivoting of the mirror, and supply of electric power to the laser light source is cut when the scan operation of the mirror is not normal, e.g., in the case where the scan operation is completely halted, or where the period is not constant and the speed is not as predetermined.

[Patent Document 1] Japanese Patent No. 2994469
[Patent Document 2] Japanese Laid-Open Patent Publication No. 2004-254145
[Patent Document 3] Japanese Laid-Open Patent Publication No. 2004-312347
[Patent Document 4] Japanese Laid-Open Patent Publication No. 2004-333698

DISCLOSURE OF INVENTION

Problems to be Solved by the Invention

However, the above-mentioned apparatus constructions need sensors for detecting whether the scan operation of the mirror is normal or not and a control mechanism for blocking laser light or cutting supply of electric power to the laser light source when the scan operation is not normal, thus resulting in the problems of high cost and difficulties to downsize the apparatus.

For laser applications such as laser projectors, permissible radiation powers are defined under safety standards. Since an adequate brightness cannot be ensured in the range which is safe for the human eyes, there is a need for a technology which can enhance radiation power while ensuring safety.

The present invention has been made in view of the aforementioned problems, and aims to provide an image display apparatus which is capable of performing display with safety and adequate brightness, while realizing downsizing and cost reduction.

Means for Solving the Problems

A scan unit according to the present invention is a scan unit comprising: a reflecting portion for reflecting laser light; and an enclosure portion having a movable object enclosed within a hollow, characterized in that the movable object moves in accordance with an angular velocity of the scan unit, thereby changing a reflecting state of the reflecting portion with respect to the laser light.

In one embodiment, at least a part of the enclosure portion is positioned near a surface of the reflecting portion that reflects the laser light; and the movable object moves in accordance with the angular velocity of the scan unit to cover at least a part of the reflecting portion.

In one embodiment, the reflecting portion is provided on an inner surface of the enclosure portion; the enclosure portion includes a transmitting portion for transmitting the laser light, the transmitting portion opposing the reflecting portion; and the movable object moves in between the reflecting portion and the transmitting portion.

In one embodiment, the movable object moves in a direction of covering a smaller proportion of the reflecting portion as the angular velocity increases, and moves in a direction of covering a larger proportion of the reflecting portion as the angular velocity decreases; and a reflected light amount from the reflecting portion is smaller when the proportion of covering the reflecting portion is large than when the proportion of covering the reflecting portion is small.

In one embodiment, the movable object moves in a direction of covering a larger proportion of the reflecting portion when the scan unit comes to a halt; and a reflected light amount from the reflecting portion decreases when the movable object moves in the direction of covering a larger proportion of the reflecting portion.

In one embodiment, the movable object moves within 0.25 seconds after the scan unit comes to a halt.

In one embodiment, the reflecting portion is provided on the enclosure portion; and the movable object moves in accordance with an angular velocity of the scan unit to deform the reflecting portion.

In one embodiment, a degree of scattering of reflected light from the reflecting portion changes in accordance with deformation of the reflecting portion; and the movable object moves in a direction of decreasing the degree of scattering as the angular velocity increases, and moves in a direction of increasing the degree of scattering as the angular velocity decreases.

In one embodiment, a degree of scattering of reflected light from the reflecting portion changes in accordance with deformation of the reflecting portion; and the movable object moves in a direction of increasing the degree of scattering when the scan unit comes to a halt.

In one embodiment, the movable object moves within 0.25 seconds after the scan unit comes to a halt.

An image display apparatus according to the present invention is an image display apparatus comprising: the aforementioned scan unit; a light source for outputting the laser light; and a driving section for driving the scan unit, characterized in that the image display apparatus displays an image with at least a part of the laser light reflected by the scan unit and projected; and the state of the projected laser light changes in accordance with a movement of the movable object.

Effects of the Invention

According to the present invention, the movable object moves in accordance with the angular velocity of the scan unit, thereby changing the reflecting state of the reflecting portion with respect to laser light. As a result, even when the scan speed of the scan unit lowers or the scan operation has come to a halt, the radiation power (energy density) of the laser light which is projected outside the image display apparatus can be decreased, thereby providing an image display apparatus which is highly safe for the eyes. According to the present invention, there is no need for sensors for detecting whether the scan operation of the mirror is normal or not and a control mechanism for blocking laser light or cutting supply of electric power to the laser light source when the scan operation is not normal. As a result, there is provided an image display apparatus which is capable of performing display with safety and adequate brightness, while realizing downsizing and cost reduction.

In one embodiment, the movable object moves in accordance with the angular velocity of the scan unit to cover at least a part of the reflecting portion, thereby decreasing the light amount of the laser light reflected by the reflecting portion.

In one embodiment, the movable object moves in accordance with the angular velocity of the scan unit to deform the reflecting portion, thereby increasing the degree of scattering of the reflected light from the reflecting portion.

Figure 1:
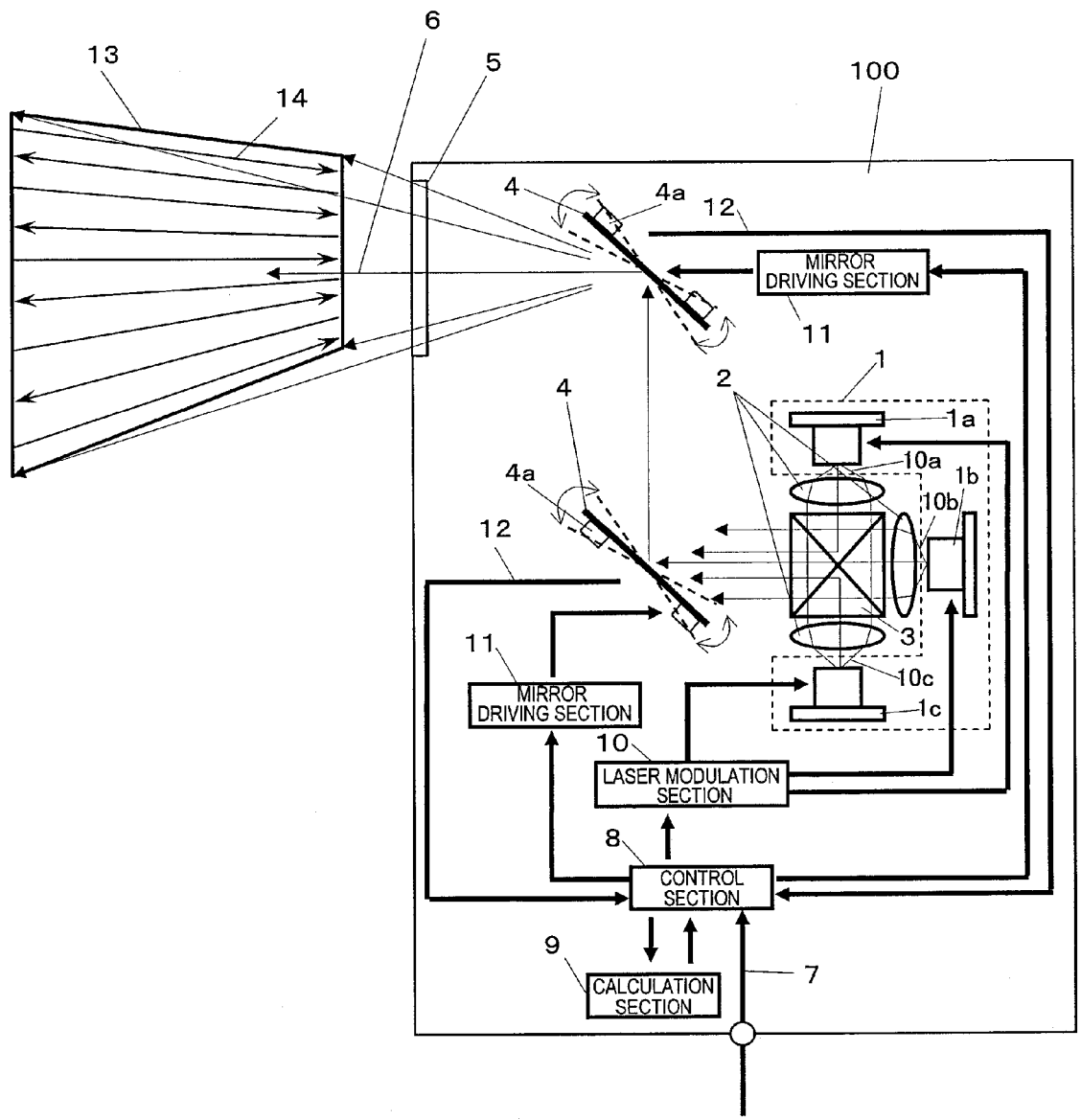
FIG. 1 A diagram showing an image display apparatus according to an embodiment of the present invention.

DESCRIPTION OF THE REFERENCE NUMERALS 1 light source
2 collimating lens
3 dichroic prism
4 scan unit
5 aperture
6 laser light
7 image signal
8 control section
9 calculation section
10 laser modulation section
11 mirror driving section
12 angular displacement signal
13 projection region
14 beam spot locus
18 hollow portion
19 movable object
21 reflecting portion
22 transmitting portion
23 transparent electrode
24 base
100 image display apparatus

BEST MODE FOR CARRYING OUT THE INVENTION

Hereinafter, embodiments of the present invention will be described with reference to the drawings. Like constituent elements will be denoted by reference numerals, and repetition of similar descriptions will be avoided.

Embodiment 1

With reference to FIG. 1 to FIG. 9, a first embodiment of an image display apparatus and a scan unit according to the present invention will be described. First, FIG. 1 will be referred to. FIG. 1 is a diagram showing an image display apparatus 100 according to the present embodiment. The image display apparatus 100 displays an image on a screen or the like with at least a portion of projected laser light.

The image display apparatus 100 includes a light source 1 for outputting laser light 10a to 10c, collimating lenses 2, a dichroic prism 3, and scan units 4 for allowing the laser light 10a to 10c to be reflected and projected. The light source 1 outputs laser light of each color of n primary colors (where n is a natural number equal to or greater than 3). In this example, the light source 1 includes a light-emitting element 1a for outputting red laser light 10a, a light-emitting element 1b for outputting green laser light 10b, and a light-emitting element 1c for outputting blue laser light 10c. Note that the light source 1 may output multiprimary-color laser light of four primary colors or more.

The image display apparatus 100 further includes: a laser modulation section 10 for modulating the laser light 10a to 10c; mirror driving sections 11 for driving the scan units 4; and a control section 8 and a calculation section 9 for controlling these constituent elements of the image display apparatus 100.

The three primary colors (RGB) of laser light 10a to 10c which have been output from the light source 1 are each narrowed by each collimating lens 2, and merged by the dichroic prism 3 to become a single ray of projected laser light 6. The projected laser light 6 which has been output from the dichroic prism 3 enters the scan units 4.

The image display apparatus 100 includes two scan units 4, which are scan mirror devices performing one-dimensional scanning. One of the scan units 4 subjects the projected laser light 6 to scanning along the horizontal direction, whereas the other scan unit 4 subjects the projected laser light 6 to scanning along the vertical direction. Thus, the projected laser light 6 is subjected to two-dimensional scanning.

The projected laser light 6 having been reflected by the two scan units 4 is projected through an aperture (optical modulator) 5 onto a projection region 13, and is subjected to two-dimensional scanning. A projection screen may be installed in the projection region 13. Although FIG. 1 shows an example of using two scan units 4 which are mono-axial pivoting mirror elements, one bi-axial pivoting mirror element may be used, or a rotating polygon mirror may be used.

An image signal 7 which represents an image to be displayed is input to the control section 8. The calculation section 9 performs calculations necessary for the control operation of the control section 8. The control section 8 controls the operations of the laser modulation section 10 and the mirror driving sections 11. In synchronization with the laser modulation section 10 modulating the laser light, the mirror driving sections 11 drive the scan units 4. From each scan unit 4, an angular displacement signal 12 representing an angular displacement of the mirror is output, and the scan unit 4 is feedback-controlled as the angular displacement signal 12 is input to the control section 8.

The laser light 6 which is subjected to scanning by the scan units 4 forms a beam spot locus 14 in the projection region 13. The following scanning approaches are possible for the laser light 6.

Figure 2:
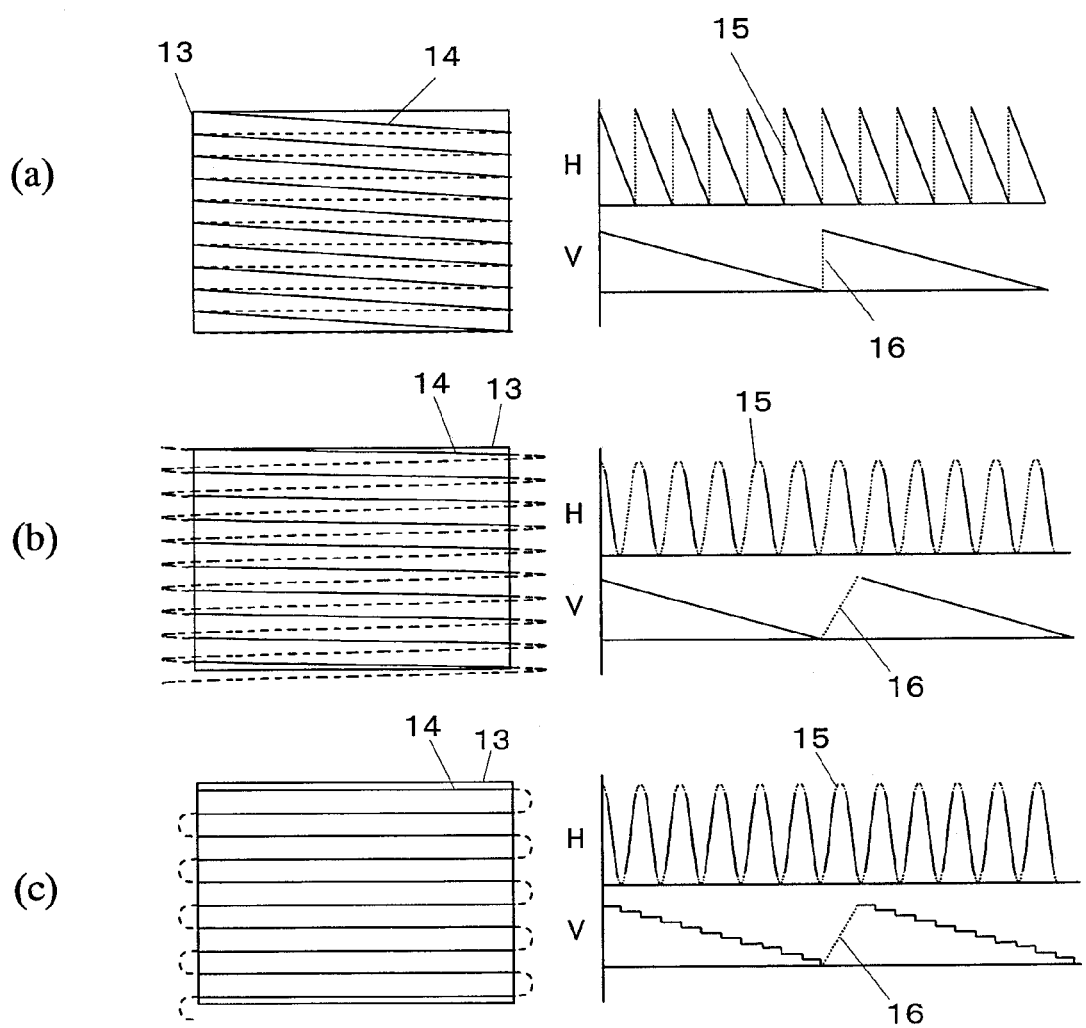
FIG. 2 (a) to (c) are diagrams showing scanning approaches according to an embodiment of the present invention.

FIG. 2 shows laser beam spot loci 14 by scanning approaches, and driving signal waveforms along a horizontal direction (H) and a vertical direction (V).

FIG. 2(a) illustrates a linear raster scanning approach, where linear driving signal waveforms are exhibited along both the horizontal direction and vertical direction. This scanning approach is adopted in the case of using a polygon mirror element. Since the driving frequency is high along the horizontal direction, it is usually difficult to linearly drive a pivoting mirror at a rapid rate. The periods of returning from the right end to the left end, and from the bottom to the top, of the screen are blanking periods in which only the mirror returns without activating laser light. A horizontal blanking period 15 and a vertical blanking period 16 are shown by dotted lines.

FIG. 2(b) illustrates a resonant raster scanning approach, where laser light is used for scanning along the horizontal direction, based on a resonation operation of a pivoting mirror. In resonance driving, a large amplitude is obtained with a relatively small force as compared to the case of linearly driving a pivoting mirror. Since the frequency along the vertical direction is low, it would be possible to linearly drive a galvano mirror.

Moreover, since the mirror operation is sinusoidal in resonance driving, and one-way scanning occurs along the horizontal direction, the horizontal blanking period becomes longer, and the lighting time of laser light is halved.

FIG. 2(c) illustrates a resonant raster scanning approach, where reciprocal scanning takes place along the horizontal direction. Reciprocal scanning facilitates driving because the driving frequency may be half. As compared to the method shown in FIG. 2(b), the lighting time of laser light is twice as long, thus resulting in a high efficiency. Strictly speaking, however, the scanning lines are not parallel. Therefore, it is necessary to correct the vertical driving signal waveform so as to become stepwise, thus ensuring that the scanning lines are parallel.

Next, each scan unit 4 will be described more specifically.

In the present invention, the scan unit 4 is equipped with a mechanism which, in the event of an abnormal operation of the scan unit 4, lowers the reflected light amount and/or energy density of the laser light 6 reflected by the scan unit 4. The details of this mechanism will be described below. This mechanism is highly reliable because of lacking a mechanical movable section and is maintenance-free, thus realizing a very small and inexpensive construction with an increased safety.

In the present invention, there is no need for a sensor for detecting whether or not the scan operation of the mirror is normal and a control mechanism for blocking the laser light or cutting the supply of electric power to the laser light source when the scan operation is not normal. Thus, downsizing and cost reduction of the image display apparatus can be realized.

Figure 5:
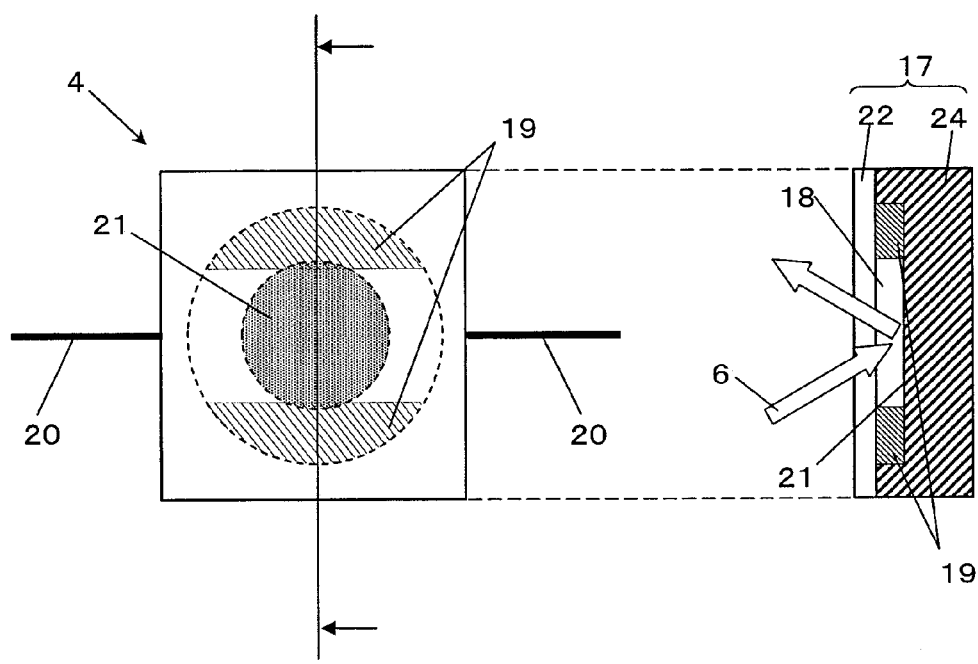
FIG. 5 (a) is a diagram showing a scan unit according to an embodiment of the present invention, as well as a state of a movable object when the scan unit is operating normally. (b) is a diagram showing a scan unit according to an embodiment of the present invention, as well as a state of a movable object when the scan unit is at halt.
Figure 5:
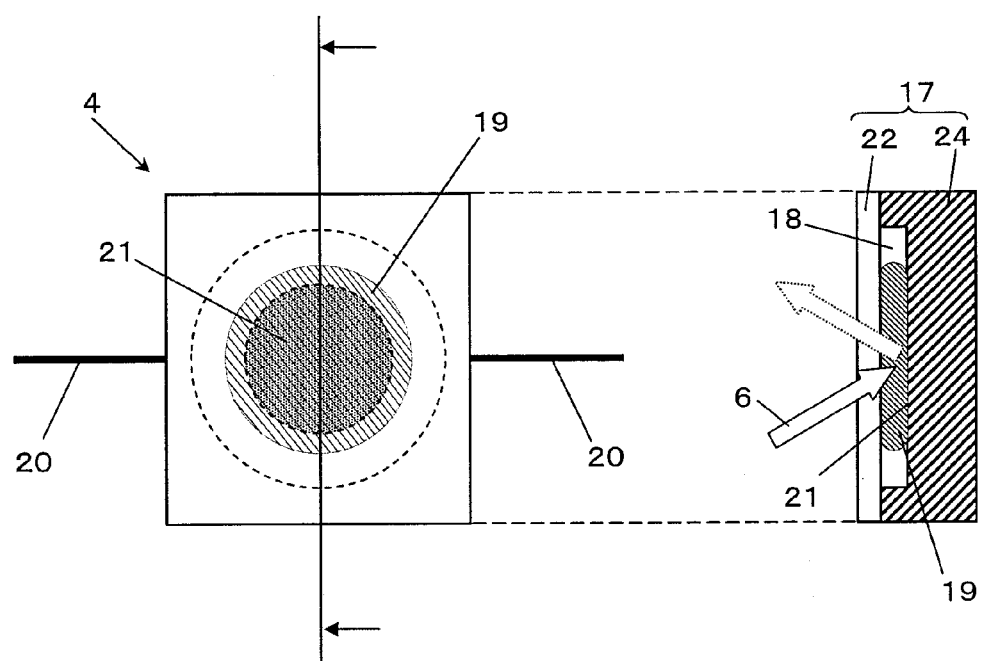

FIG. 5 shows a scan unit 4. Each left-hand side diagram in FIG. 5 is a view showing the scan unit 4 from its reflection surface side, whereas each right-hand side diagram is a cross-sectional view of the scan unit 4. FIG. 5(a) shows the scan unit 4 when operating normally, whereas FIG. 5(b) shows the scan unit 4 when at halt.

The scan unit 4 includes a reflecting portion 21 for reflecting the laser light 6, an enclosure portion 17 in which a movable object 19 is enclosed, and suspensions 20 for providing support as a pivot axis of the scan unit 4. The enclosure portion 17 includes a base 24 and a transmitting portion 22, such that the base 24 and the transmitting portion 22 define a hollow portion 18 within the enclosure portion 17. The movable object 19 is enclosed in the hollow portion 18. The movable object 19 is a substance which is less likely to reflect the laser light 6 than is the reflecting portion 21, e.g., liquid, powder, or a mixture of liquid and powder.

The reflecting portion 21 is provided at an inner surface of the enclosure portion 17, on the base 24. The transmitting portion 22 for transmitting the laser light 6 is positioned on a surface of the reflecting portion 21 that reflects laser light, and opposes the reflecting portion 21 via the hollow portion 18. The movable object 19 moves in between the reflecting portion 21 and the transmitting portion 22.

One end of each suspension 20 is connected to the base 24. The other end of each suspension 20 is affixed to a stationary frame (not shown). The reflecting portion 21 and the enclosure portion 17 form a movable section, and the scan unit 4 includes actuators 4a for allowing the reflecting portion 21 and the enclosure portion 17 to oscillate (FIG. 1). There are various methods for driving the reflecting portion 21 and the enclosure portion 17, e.g., electromagnetic driving, electrostatic driving, and piezoelectric driving; however, such driving methods are known in themselves, and their descriptions are omitted herein.

The laser light 6 entering the scan unit 4 is transmitted through the transmitting portion 22 and reflected by the reflecting portion 21, again transmitted through the transmitting portion 22, and projected outside the image display apparatus 100.

While performing a normal operation, the scan unit 4 is oscillating at a desired frequency, with the suspensions 20 as an axis, as shown in FIG. 5(a). An inertial force (centrifugal force) which is generated in the outer peripheral direction of the hollow portion 18 due to the oscillation of the scan unit 4 acts on the movable object 19. As a result, the movable object 19 moves in the outer peripheral direction of the hollow portion 18, so that the movable object 19 does not exist near the center of the hollow portion 18, allowing the laser light 6 which is transmitted through the transmitting portion 22 to be reflected by the reflecting portion 21. Thus, while the scan unit 4 is performing a normal operation, the laser light 6 is reflected by the scan unit 4 and subjected to scanning.

While the scan unit 4 is performing an abnormal operation, e.g., when the scan unit 4 has come to a halt, the movable object 19 having moved towards the outer periphery of the hollow portion 18 gathers near the center as shown in FIG. 5(b), so that the entire reflecting portion 21 is covered with the movable object 19. The laser light 6 entering the reflecting portion 21 thus covered with the movable object 19 is absorbed by the movable object 19, whereby the reflected light amount and optical energy density of the laser light 6 reflected by the reflecting portion 21 is lowered.

Thus, the movable object 19 moves within the hollow portion 18 in accordance with the angular velocity of the scan unit 4. With the movement of the movable object 19, the reflecting state (reflected light amount and/or degree of scattering of reflected light) of the reflecting portion 21 changes. The movable object 19 moves in the direction of covering a smaller proportion of the reflecting portion 21 when the angular velocity of the scan unit 4 increases, and moves in the direction of covering a larger proportion of the reflecting portion 21 when the angular velocity decreases. When the scan unit 4 comes to a halt from a normally-oscillating state, the movable object 19 moves in the direction of covering a larger proportion of the reflecting portion 21. The reflected light amount from the reflecting portion 21 is smaller when the movable object 19 covers a large proportion of the reflecting portion 21 than when the movable object 19 covers a small proportion of the reflecting portion 21.

The process where the movable object 19 having moved towards the outer periphery of the hollow portion 18 gathers near the center when the scan unit 4 comes to a halt will be described. The inertial force which is generated in the outer peripheral direction of the hollow portion 18 due to the oscillation of the scan unit 4 at a desired frequency affects not only the movable object 19 but also the gas which is enclosed in the hollow portion 18. Since the hollow portion 18 is sealed airtight, due to the inertial force, a pressure distribution of gas occurs along the direction of the outer periphery of the hollow portion 18 from the oscillation axis of the scan unit 4. In the pressure distribution that is occurring, there is an increasing pressure toward the outer periphery of the hollow portion 18 from the oscillation axis of the scan unit 4. When the scan unit 4 oscillating at a desired frequency comes to a halt, the imbalance in the gas pressure distribution that has occurred is eliminated, so that the gas moves in a direction of lower pressure (i.e., in the direction of the oscillation axis of the scan unit 4). Together with this movement of the gas, the movable object 19 also moves near the center.

As a material which efficiently reflects visible light, the reflecting portion 21 is coated with an aluminum film. Other than aluminum, it is also possible to use gold, silver, or the like. Depending on the light source used (wavelength band used), a dielectric film may also be used.

In the case where the movable object 19 is a hydrophilic liquid which absorbs visible light, e.g., a liquid containing melanin pigment (Chinese ink or the like), it is desirable that the reflecting portion 21 is a hydrophilic metal film and that the base 24 is a hydrophobic material such as silicon. This will allow the movable object which has gathered near the center of the hollow portion to be maintained near the center.

Figure 8:
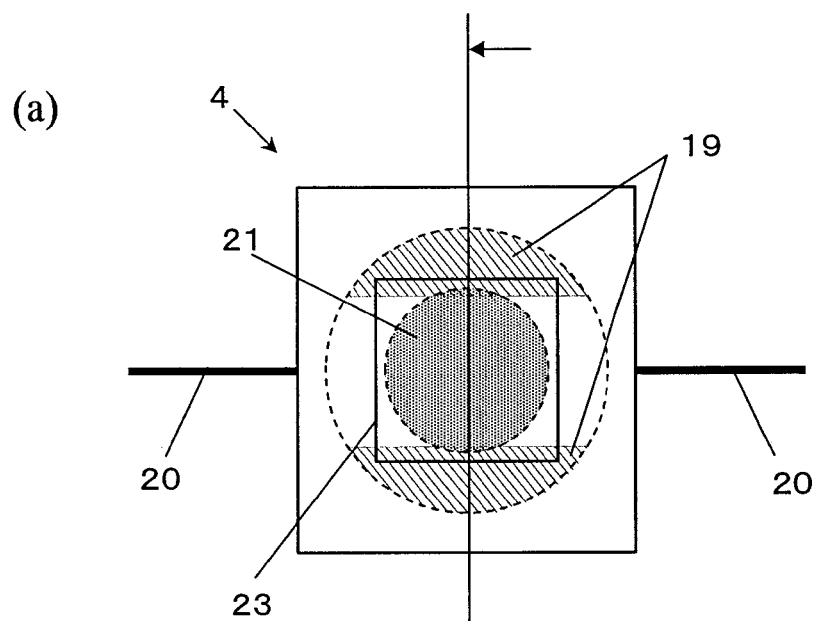
FIG. 8 (a) is a diagram showing a state of a movable object when a scan unit according to an embodiment of the present invention is operating normally. (b) is a diagram showing a state of a movable object when a scan unit according to an embodiment of the present invention is at halt.
Figure 8:
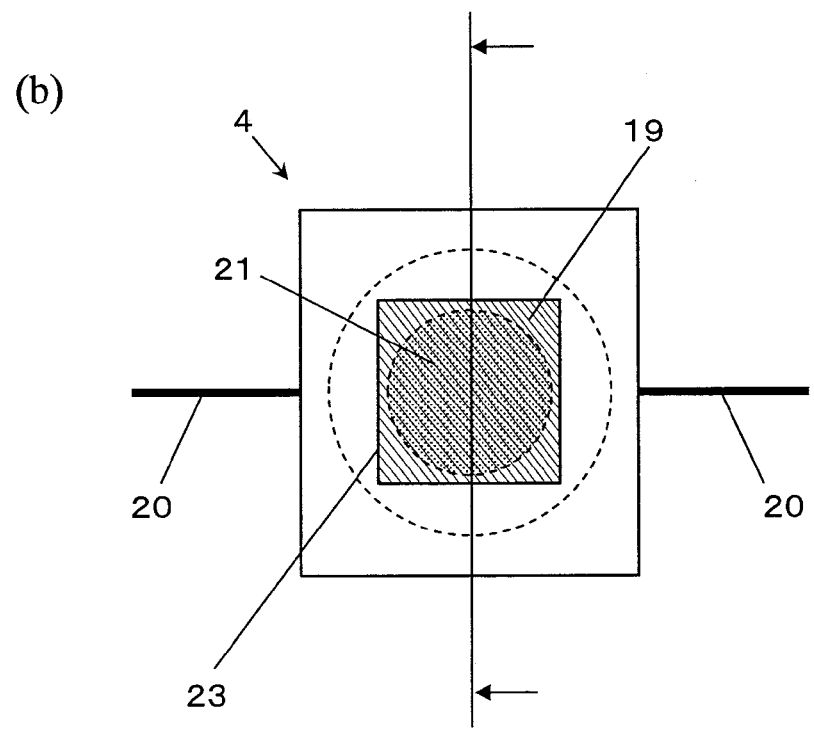

Moreover, as shown in FIG. 8, charged particles may be used as the movable object 19, and a voltage may be applied to the transmitting portion 22, thereby maintaining the movable object 19 near the center of the hollow portion 18. FIG. 8(a) shows a state where the scan unit 4 is performing a normal operation, whereas FIG. 8(b) shows a state where the scan unit 4 is at halt. By providing a transparent electrode 23 in the transmitting portion 22 and applying a voltage to the transparent electrode 23 so that the movable object 19 will maintain a state of having gathered near the center, the movable object 19 can be maintained near the center of the hollow portion 18.

The transmitting portion 22 should transmit the laser light 6 entering the scan unit 4, and again transmit the laser light 6 having been reflected by the reflecting portion 21; therefore, a material which efficiently transmits visible light is used, or a thickness for ensuring reduced absorption at the transmitting portion 22 is used. Examples of the material of the transmitting portion 22 include quartz glass, optical glasses (e.g., BK-7), Pyrex (registered trademark), sapphire, acrylics, and polycarbonates.

Thus, according to the present embodiment, when the scan unit 4 performing a scan with the laser light 6 comes to a halt, the movable object 19 covers the reflecting portion 21 so that the laser light 6 entering the scan unit 4 is absorbed by the movable object 19, whereby the reflected light amount and optical energy density can be reduced.

Note that use of a material which absorbs laser light 6 as the movable object 19 is only exemplary. A material which scatters laser light 6 may also be used.

Examples of such materials include: a liquid containing a nanosize metal material, called nanopaste (e.g., gold, silver, and copper); a liquid containing glass such as silicon, quartz, or optical glass (e.g., BK-7); and a liquid containing microbeads of plastic, e.g., acrylics or polycarbonates.

Other than the case where the scan unit 4 comes to a halt, there may also be cases where the scan unit 4 decreases in angular velocity. In such cases, too, the movable object 19 can move near the center of the hollow portion 18 in accordance with the angular velocity of the scan unit 4. In order to allow the movable object 19 to easily gather near the center of the hollow portion 18 when the scan unit 4 is at halt, a part of the movable object 19 may be in contact with or overlapping the reflecting portion 21 even while the scan unit 4 is oscillating at a desired frequency.

Although the above description illustrates that the movable object 19 completely covers the reflecting portion 21 when the scan unit 4 comes to a halt, the entire reflecting portion 21 does not need to be covered by the movable object 19 if the necessary effect is obtained by only covering a part of the reflecting portion 21.

Note that the movable object 19 may be a magnetic substance (liquid, powder, or a mixture of liquid and powder), e.g., a magnetic fluid. In this case, the reflecting portion 21 is coated with a material for generating a magnetic force, and, when the inertial force due to the scan operation of the scan unit 4 is removed or reduced, by being attracted by the magnetic force, it covers the reflecting portion 21. As a result, the light entering the reflecting portion 21 of the scan unit 4 is scattered by the magnetic substance, whereby the reflected light amount and optical energy density can be lowered.

In the case where the movable object 19 contains a magnetic substance or charged particles, or where the movable object 19 is a magnetic substance or charged particles alone, magnetic force or voltage application may be used as a method of causing a move in the outer peripheral direction of the hollow portion 18 of the scan unit 4.

Figure 6:
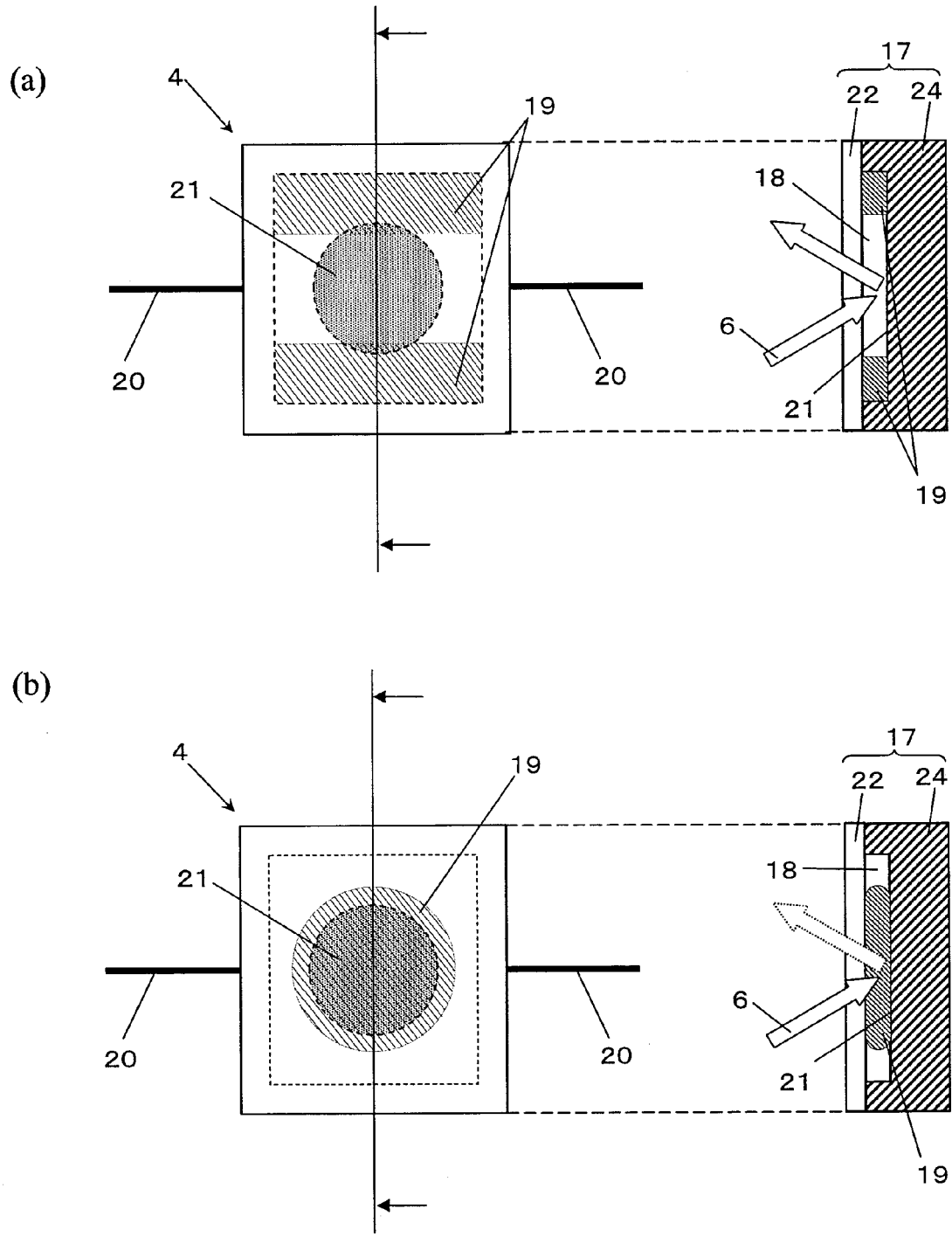
FIG. 6 (a) is a diagram showing a scan unit according to an embodiment of the present invention, as well as a state of a movable object when the scan unit is operating normally. (b) is a diagram showing a scan unit according to an embodiment of the present invention, as well as a state of a movable object when the scan unit is at halt.

As for the structure of the hollow portion 18, other than the cylindrical structure shown in FIG. 5, a rectangular solid structure of a quadrangular shape shown in FIG. 6 may be used. Each left-hand side diagram in FIG. 6 is a view showing the scan unit 4 from its reflection surface side, whereas each right-hand side diagram is a cross-sectional view of the scan unit 4. FIG. 6(a) shows the scan unit 4 when operating normally, whereas FIG. 6(b) shows the scan unit 4 when at halt.

Figure 7:
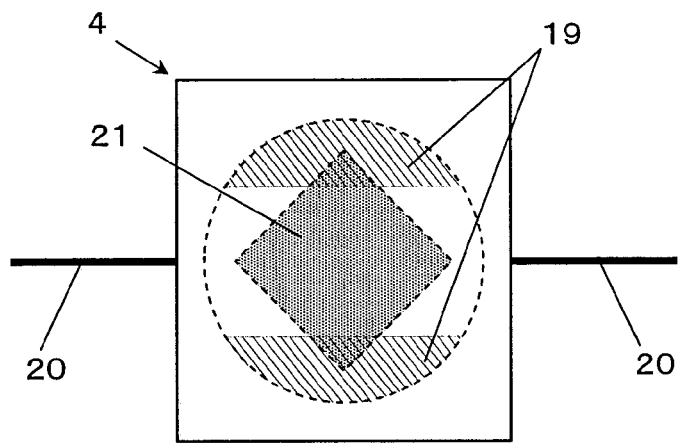
FIG. 7 (a) to (c) are diagrams showing relationships between the shape of a reflecting portion of a scan unit according to an embodiment of the present invention and a movable object.
Figure 7:
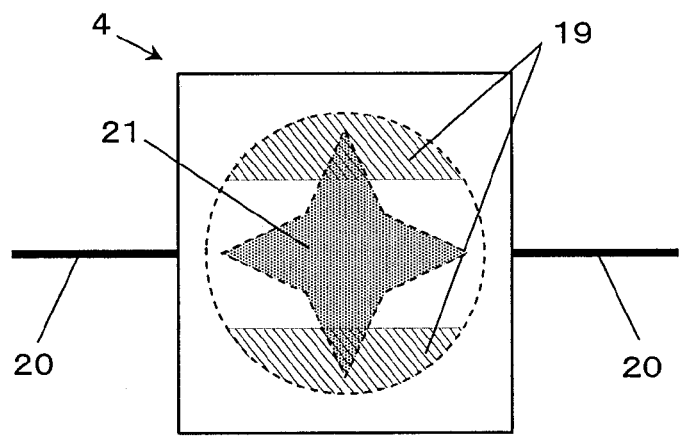
Figure 7:
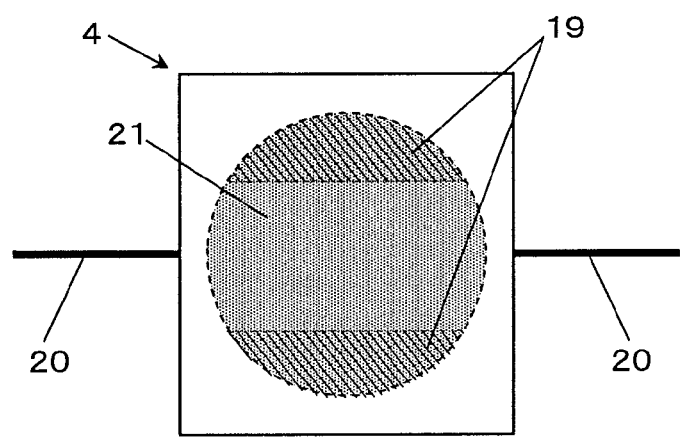

The shape of the reflecting portion 21 may be a polygon as shown in FIG. 7(a) and FIG. 7(b), other than a circle as shown in FIG. 5. As shown in FIG. 7(c), the reflecting portion 21 may be formed over all of the region of the base 24 on which it is possible to form a reflection surface. FIG. 7 is a view showing the scan unit 4 from its reflection surface side.

In order to ensure that the movable object 19 will maintain a state of having gathered near the center of the hollow portion 18 regardless of the orientation of the scan unit 4 when the scan unit 4 comes to a halt, the combination of the structure of the hollow portion 18 and the volume of the movable object 19 to be enclosed in the hollow portion 18 is adjusted.

In the case where the movable object 19 contains a magnetic substance or charged particles, or where the movable object 19 is a magnetic substance or charged particles alone, as a method of causing a move in the outer peripheral direction of the hollow portion 18, the outer periphery side of the base 24 and/or the transmitting portion 22 may be coated with a material for generating a magnetic force, or an electrode for voltage application may be provided therein.

Depending on the material surrounding the hollow portion 18 and the material of the reflecting portion 21, an inert liquid may be used as the movable object 19. As a gas to be enclosed in the hollow portion 18, an inert gas may be used, depending on the material surrounding the hollow portion 18 and the material of the reflecting portion 21.

Depending on the material surrounding the hollow portion 18, the material of the reflecting portion 21, and the material of the movable object 19, the gas which is enclosed in the hollow portion 18 may be withdrawn by a vacuum pump or the like (i.e., so as to lower the pneumatic pressure).

In order to enhance the hydrophobicity of the base 24 and the region of the transmitting portion 22 surrounding the hollow portion 18, a hydrophobic treatment or water-repellent coating may be performed. In the field of micromachining technology, treatment apparatuses which are capable of a hydrophobic treatment or water-repellent coating are also provided.

Next, a radiation power which is defined by a safety standard(s) for laser light will be described, and based on the safety standard(s), a concept to be applied in the case of emitting stronger laser light will be described, as well as the radiation power which is enabled by them and brightness of the image display apparatus.

As safety standards for laser light, there is "IEC60825-1 standard", and in Japan there is "JIS C6802 radiation safety standards for laser products" (hereinafter abbreviated as the JIS), where classification of laser products and measurement methods are defined.

Therein, accessible emission limits (hereinafter referred to as AELs) of class 1, which are regarded as basically safe, are defined in Table 1 (not shown) of the JIS, with respect to different wavelengths and exposure times. As for products which emit visible light, class 2 AELs are defined in Table 2 (not shown) of the JIS.

The above takes into consideration the fact that avoiding actions such as blinking would occur to protect the eyes against any laser light which is visible light, and, by assuming that the reaction time thereto is 0.25 seconds, stipulates 1 mW in the case where the emission duration is equal to or greater than 0.25 seconds and the same AELs as those in class 1 for 0.25 seconds or less. In other words, in the case of continuous-wave laser light, e.g., a laser pointer, the radiation output power is limited to 1 mW.

On the other hand, for scanning-type laser products, a method for determining the AEL is defined in section (f) repetitive pulse laser and modulation laser under 8.4 classification rule of the JIS.

The above stipulates that the most stringent among the following three conditions must be applied in making the determination.

1) Exposure from any single pulse within a pulse train must not exceed the AEL for a single pulse (AELsingle).

2) An average power of a pulse train lasting an emission duration T must not exceed each of the powers corresponding to the AELs defined in Tables 1 to 4 (not shown) with respect to a single pulse lasting an emission duration T.

3) An average pulse energy of pulses within a pulse train must not exceed a value (AELtrain) obtained by multiplying the AEL for a single pulse by a correction factor C5.

AELtrain=AELsingle×C5

$$C5 = N^{-0.25} \quad \text{(eq. 1)},$$

where N is a number of times the pupil is scanned in 0.25 seconds.

In the case of performing a two-dimensional scanning as in a scanning-based projector, N increases as the pupil is scanned by laser light, so that condition 3) usually becomes the most stringent. A measurement method is defined in 9.3 measurement optics of the JIS.

Figure 3:
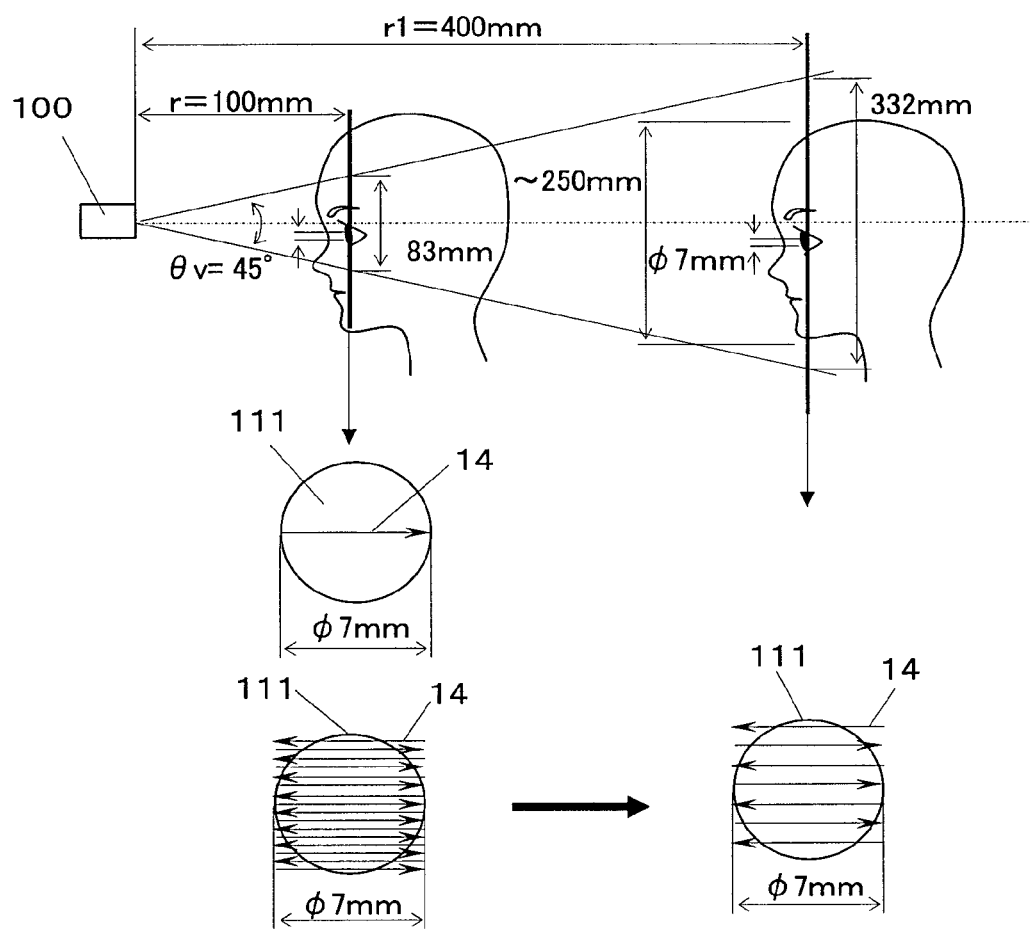
FIG. 3 A diagram showing a distance between a pupil and an image display apparatus, as well as a projection region, according to an embodiment of the present invention.

Hereinafter, with reference to FIG. 3, a calculation method for radiation power will be described. FIG. 3 is a side view showing a distance between a pupil and a projector, as well as a projection region.

Measurement conditions for the radiation power of scanning-type laser light are defined so that a measurement aperture 111 has a diameter of ϕ7 mm and a measurement distance r is 100 mm. The ϕ7 mm of the measurement aperture 111 is in accordance with the maximum value of the diameter of the human pupil. The radiation power as calculated under the defined measurement conditions will vary depending on the scanning conditions. Hereinafter, calculation examples under the following scanning conditions will be described. In each parameter, suffixes h and v represent horizontal and vertical, respectively.

Scanning Conditions:

display resolution XGA(Nh=1024, Nv=768 pixels)

frame rate fv=60 Hz angle of view θh=60°, θv=45° overscan rate (angle of view/total scanning angle) Kosh=Kosv=0.7 reciprocal scanning along the horizontal direction

Kub=2 (corresponding to the scanning approach of FIG. 2(c))

The horizontal scanning frequency fh is expressed as follows.

$$fh = fv \times Nv/Kosv/Kub = 32.9 \text{ kHz} \quad \text{(eq. 2)}$$

The time t over which a pupil with D=ϕ7 mm that is located at a distance r=100 mm as shown in FIG. 3 is traversed by laser light is expressed as follows.

$$t = \text{viewing angle}/\text{horizontal scanning} \quad \text{(eq. 3)}$$
$$\text{angular velocity of the measurement aperture}$$
$$= (D/r)/(2 \times fh \times \theta h/Kosh)$$
$$= 7.1E - 7(\text{sec})$$

The number of times N that the pupil is scanned in 0.25 seconds is expressed as follows.

$$N = (D/r)/(\theta v/Nv) * fv * 0.25$$
$$= 1020(\text{times})$$

From Table 1 of the JIS, the AELsingle for t=7.1 E-7(sec) (AEL for a single pulse) is AELsingle=2.0E-7(J). From (eq. 1), an average pulse energy AELtrain within a pulse train (AEL for repetitive pulses) is:

$$AELtrain = AELsingle \times N^{-0.25} \quad \text{(eq. 4)}$$
$$= 2.0E - 7 \times 1020^{-0.25}$$
$$= 3.54E - 8(J).$$

(which corresponds to the state of the lower left measurement aperture 111 among the three measurement apertures 111 shown in FIG. 3)

The radiation power Ptrain is:

$$Ptrain = AELtrain/t \quad \text{(eq. 5)}$$
$$= 3.54E - 8/7.1E - 7 * 1000$$
$$= 49.9(\text{mW}).$$

Accordingly, if the peak radiation power of the projector is reduced to 50 mW or less, then: the radiant energy amount which enters the pupil when as near as 100 mm is at a safe level; at a distance of 100 mm or more, the laser light is dispersed and thus is even safer; at a distance of 100 mm or less, the laser light scanning the pupil is not focused on a single point on the retina, and thus is safe. In other words, a safe level is obtained under all conditions.

Now, from the AEL for a single pulse according to the aforementioned condition 1), the radiation power is derived to be:

$$Psingle = AELsingle/t \quad \text{(eq. 6)}$$
$$= 2.0E - 7/7.1E - 7$$
$$= 281.7(\text{mW}),$$

which is about 5.6 times as large a power.

This corresponds to the case where the number of times that the pupil is traversed by laser light is limited to one time (which corresponds to the state of the upper left measurement aperture 111 among the three measurement apertures 111 shown in FIG. 3)

Therefore, by performing appropriate processing, it becomes possible to increase the radiation power to about mW at the most.

Similarly, P(mW) is as follows with respect to the number of times N.

TABLE 1

| N | N^-0.25 | P (mW) |
|---|---------|--------|
| 1 | 1.00 | 281.7 |
| 2 | 0.84 | 236.9 |
| 3 | 0.76 | 214.0 |
| 4 | 0.71 | 199.2 |
| 5 | 0.67 | 188.4 |
| 6 | 0.64 | 180.0 |
| 7 | 0.61 | 173.2 |
| 8 | 0.59 | 167.5 |
| 9 | 0.58 | 162.6 |
| 10 | 0.56 | 158.4 |
| 11 | 0.55 | 154.7 |
| 12 | 0.54 | 151.3 |

Thus, a number of scans may be selected so as to correspond to the peak power which is required for the projector. For example, in the case where the peak power P=150 mW, the number of scans may be limited to 12 times.

When the peak radiation power is 50 mW, the projector has a brightness of about 10 lumen. In order to ensure a brightness that is visible in a room at 400 lux (which is the brightness of a common office), e.g., 500 lux, the projection size would be about 8 inches. Assuming a projection size of 19 inches, the brightness of the screen would be about 89 lux, which is not visible in a bright room.

On the other hand, when the peak radiation power is the maximum 280 mW, the projector has a brightness of 56 lumen, thus resulting in about 500 lumen with 19 inches. In other words, as described above, by performing control so that the number of times that the pupil is traversed by laser light is limited, a sufficiently bright screen can be obtained even when projected into a greater size, while ensuring safety.

When the measurement distance is made farther than mm, both t and N become smaller, thus resulting in a greater calculated radiation power Ptrain. When t=1.78E-7 (s) and N=255 (times), at a measurement distance of about mm, the Ptrain would be 281.7 mW (about 280 mW) (which corresponds to the state of the lower right measurement aperture 111 among the three measurement apertures 111 shown in FIG. 3).

In other words, even when the radiation power is increased to 280 mW, the energy entering the pupil would be at a safe level at 400 mm or farther away, which means that there is no problem if the aforementioned processing is performed at least in a range from 100 mm to 400 mm.

Accounting for the aforementioned conditions, it would become possible to provide safety measures in a state where the image display apparatus is performing a normal operation, by providing in the image display apparatus a means for detecting intrusion of a human or the like into the optical path from the image display apparatus to the projection region and a means for detecting a human or the like that has already been present in the optical path when the projection region is irradiated. However, when the scan unit performing a scan with laser light comes to a halt, the emission duration at a fixed position will be 0.25 seconds or more, and therefore the radiation output power needs to be kept down to 1 mW or less in the case of continuous-wave laser light. By taking this into consideration, the viscosity and amount of the movable object 19, the volume and shape of the hollow portion 18, and the like are prescribed so as to allow the movable object 19 of the present embodiment to move to lower the reflected light amount within 0.25 seconds. Thus, even if the scan unit 4 is halted in a state where the laser light 6 entering the scan unit 4 has an output power higher than 1 mW, it is possible to reduce the energy of the laser light which is projected at a fixed position outside the apparatus to 1 mW or less, within 0.25 seconds. As a result, when laser light which is visible light enters an eye, the eye can be protected even if an avoiding action such as closing of the eyelid or averting of the face fails to occur within 0.25 seconds, which is considered to protect the eye. Ideally, it is desirable to prescribe a response speed that accounts for both of the radiation power from the image display apparatus 100 and the laser light scan speed in ensuring safety. It should also be ensured that the reflected light amount of the laser light 6 is not lowered while a normal scan is occurring. Ideally, it is desirable that no loss is incurred.

For example, as has been described with reference to (eq. 6), if the radiation power of the image display apparatus 100 is prescribed while limiting the number of times N that the pupil is traversed by laser light to one, the radiation power (Psingle) will be 281.7 (mW) from the AEL for a single pulse. In this case, the time t over which the pupil (D=φ7 mm, located at a distance r=100 mm) is traversed by laser light is 7.1 E-7 (sec). In other words, irradiation of laser light with a radiation power of 281.7 (mW) at a fixed position would remain within a safe range up to an emission duration 7.1 E-7 (sec). Therefore, for safety, when the radiation power of the image display apparatus 100 is set to 281.7 (mW), it is necessary to suppress the radiation output power of reflected light to 1 mW or less within 7.1 E-7 (sec).

Figure 4:
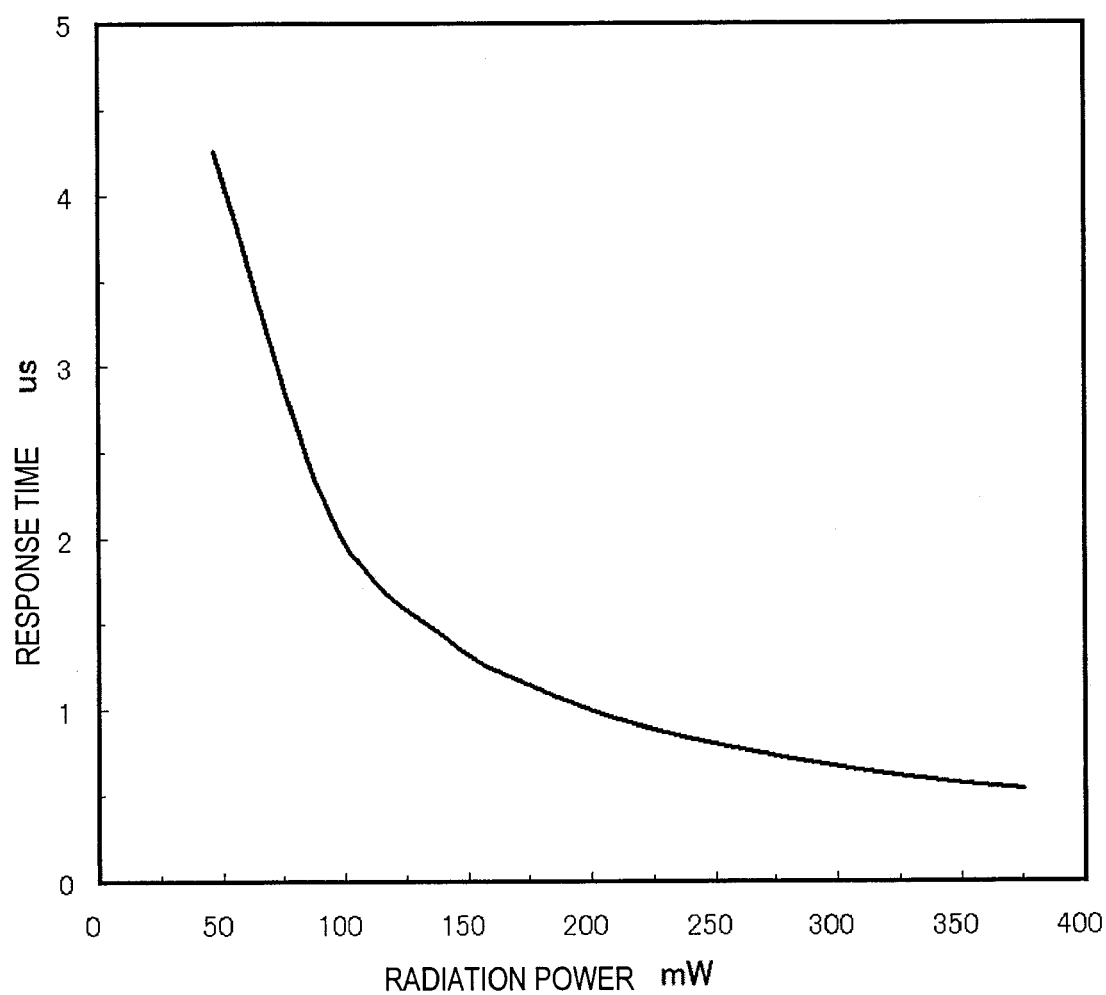
FIG. 4 A diagram showing a correlation between radiation power and response speed for obtaining the effect of reducing radiation output power of reflected light according to an embodiment of the present invention.

FIG. 4 shows a correlation diagram between the radiation power based on an AEL for a single pulse and a response speed for obtaining the effect of reducing radiation output power of reflected light. In this example, a vertical synchronous frequency of 60(Hz) and a horizontal angle of view (θh) of 10' to 800 are assumed, and with respect to the vertical angle of view (θh), a screen aspect ratio (vertical/horizontal)= 0.75 is set.

At a peak position of the oscillation amplitude of the scan unit 4 (i.e., a point where the oscillation turns around), the scan substantially comes to a temporary stop. It is desirable that the aperture 5 is designed so that the laser light is blocked in such a state. In other words, the aperture 5 is designed so that any single pulse of light with a radiation power 281.7 (mW) will not be radiated at a fixed position for 7.1 E-7 (sec) or longer.

Note that the laser light is not blocked while achieving a normal scan. Ideally, while laser light with a radiation power 281.7 (mW) is being used to scan in a manner of traversing the pupil in 7.1 E-7 (sec), the laser light is not blocked.

Thus, according to the present embodiment, the viscosity and amount of the movable object 19, the volume and shape, etc., of the hollow portion 18 are prescribed so that the movable object 19 is able to move in a manner of lowering the reflected light amount within 0.25 seconds when the scan unit 4 has come to a halt. As a result, the amount of optical energy entering the pupil can be reduced to 1 mW or less.

In an embodiment where charged particles are used as the movable object 19 and a voltage is applied to the transmitting portion 22, the moving speed of the movable object 19 to near the center of the hollow portion 18 can be enhanced by increasing the voltage that is applied to the transmitting portion 22. In the case where the transparent electrode 23 (FIG. 8) is provided on the outer surface of the transmitting portion 22, the intensity of the electric field relative to the movable object 19 can be increased by making the thickness of the transmitting portion 22 as small as possible. On the other hand, in an embodiment where a magnetic substance is used as the movable object 19 and the reflecting portion 21 is coated with a material for generating a magnetic force, the moving speed of the movable object 19 to near the center of the hollow portion 18 can be enhanced by increasing the magnetic force generated from the reflecting portion 21. Moreover, by decreasing the size of the charged particles and the particles of magnetic substance, the drag during a move can be decreased. By adopting such constructions for the scan unit 4, it becomes possible to move the movable object 19 so as to lower the reflected light amount within 0.25 seconds when the scan unit 4 has come to a halt.

Although an effect of reducing the drag during a move of the movable object 19 to increase the moving speed is obtained by withdrawing the gas enclosed in the hollow portion 18 with a vacuum pump or the like (i.e. so as to lower the pneumatic pressure), lowering the pressure of the gas enclosed in the hollow portion 18 further provides an effect of preventing deterioration of the material composing the hollow portion 18 and the movable object 19. In this case, the moving speed of the movable object 19 changes in accordance with the gas pressure distribution. Particularly in the case where the movable object 19 is powder, a notable effect of enhancing the moving speed of the movable object 19 is obtained. By adopting such constructions for the scan unit 4, it becomes possible to move the movable object 19 so as to lower the reflected light amount within 0.25 seconds when the scan unit 4 has come to a halt.

Note that the entire hollow portion 18 may be filled with a mixture of liquid and powder, or filled with a liquid alone.

Although a laser light source is used as a light source in the present embodiment, the present embodiment can also be used as safety measures of an image display apparatus in which a white light source such as a halogen lamp is used.

Figure 9:
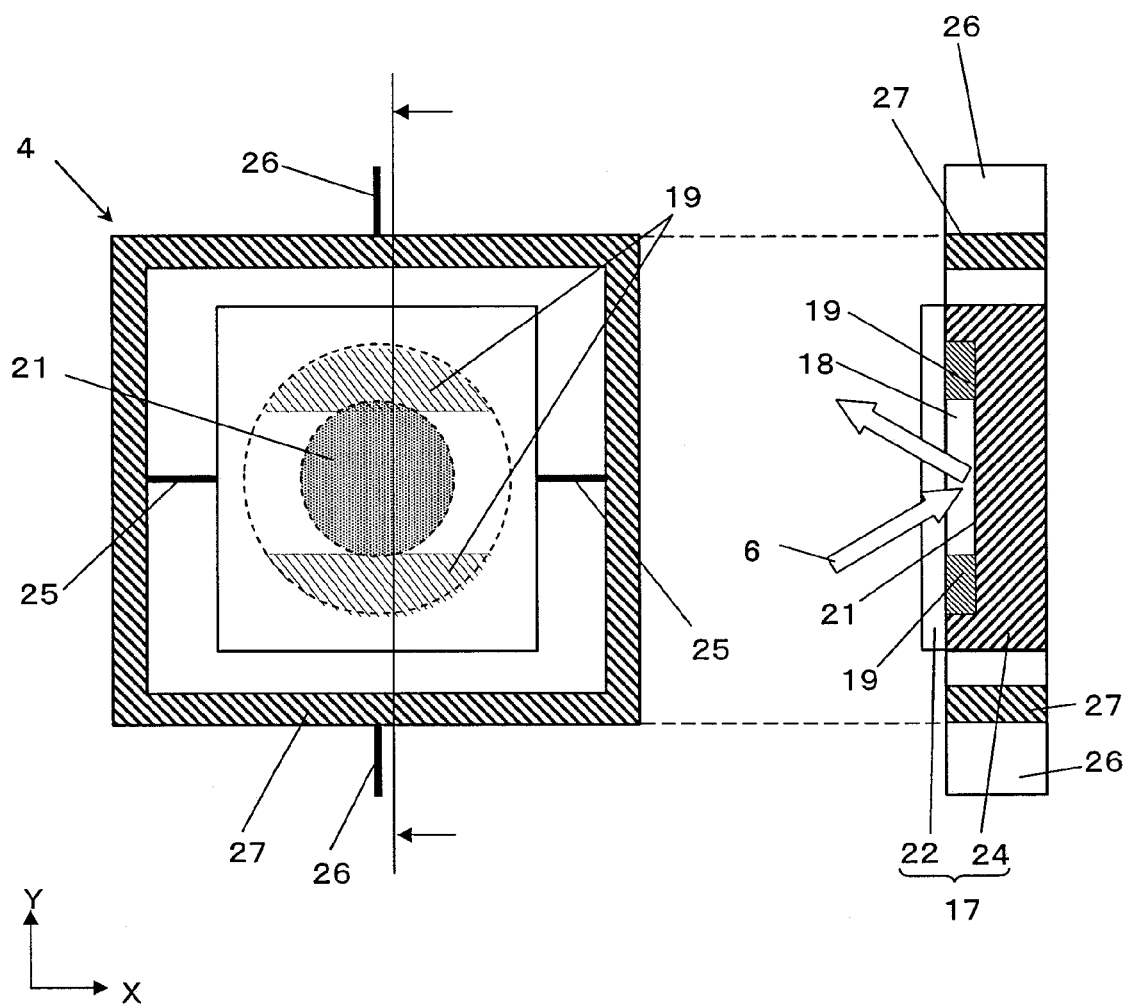
FIG. 9 A diagram showing a scan unit according to an embodiment of the present invention as a bi-axial pivoting scan mirror device.

FIG. 1 illustrates a scanning-based image display apparatus 100 in which two scan mirror devices of a one-dimensional scanning approach are used as the scan units 4. It is desirable that the aforementioned construction in which the reflecting portion 21 is covered with the movable object 19 is applied to both of the two scan units 4. Moreover, a scan mirror device of a two-dimensional scanning approach as shown in FIG. 9 may be used as scan unit 4. The present invention is also applicable as safety measures for an image display apparatus in which a scan mirror device(s) of a two-dimensional scanning approach is used.

With reference to FIG. 9, a scan unit 4 which is a bi-axial pivoting scan mirror device includes: x-axis suspensions 25 for allowing a base 24 to pivot around an x axis; an intermediate frame 27 for supporting the base 24 via the x-axis suspensions 25; and y-axis suspensions 26 for allowing the base 24 and the intermediate frame 27 to pivot around a y axis. One end of each x-axis suspension 25 is connected to the base 24; the other end of each x-axis suspension 25 is connected to the intermediate frame 27. One end of each y-axis suspensions 26 is connected to the intermediate frame 27; the other end of each y-axis suspensions 26 is affixed to a stationary frame (not shown). Since the pivot operation of a bi-axial pivoting scan mirror device is known in itself, detailed descriptions thereof will be omitted. With such a bi-axial pivoting scan mirror device, effects similar to the effects of the present invention as described with reference to FIG. 5 to FIG. 8 are obtained.

Embodiment 2

Figure 10:
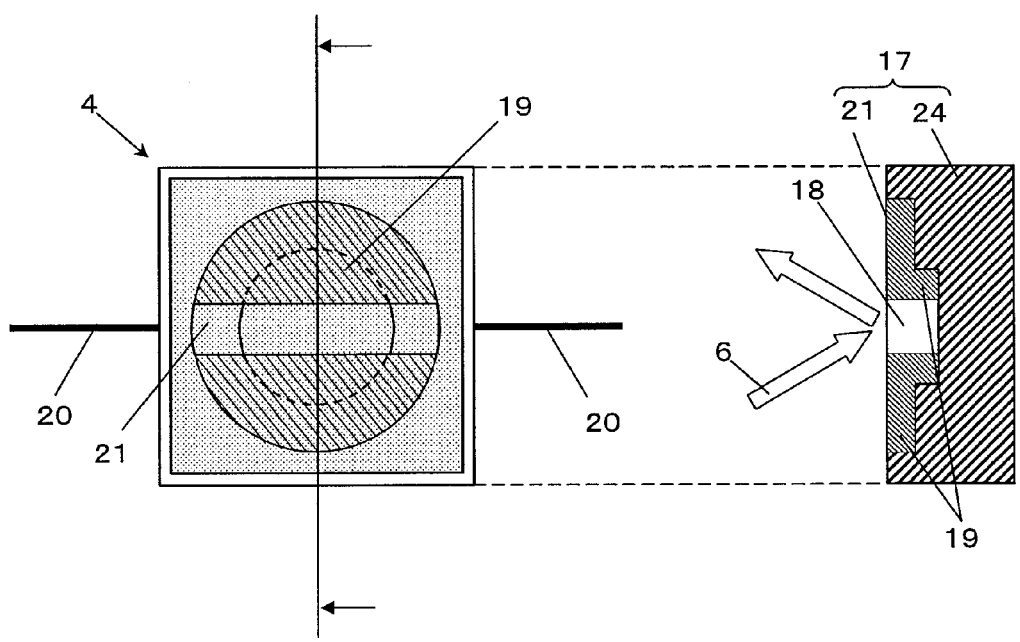
FIG. 10 (a) is a diagram showing a scan unit according to an embodiment of the present invention, as well as a state of a movable object when the scan unit is operating normally. (b) is a diagram showing a scan unit according to an embodiment of the present invention, as well as a state of a movable object when the scan unit is at halt.
Figure 10:
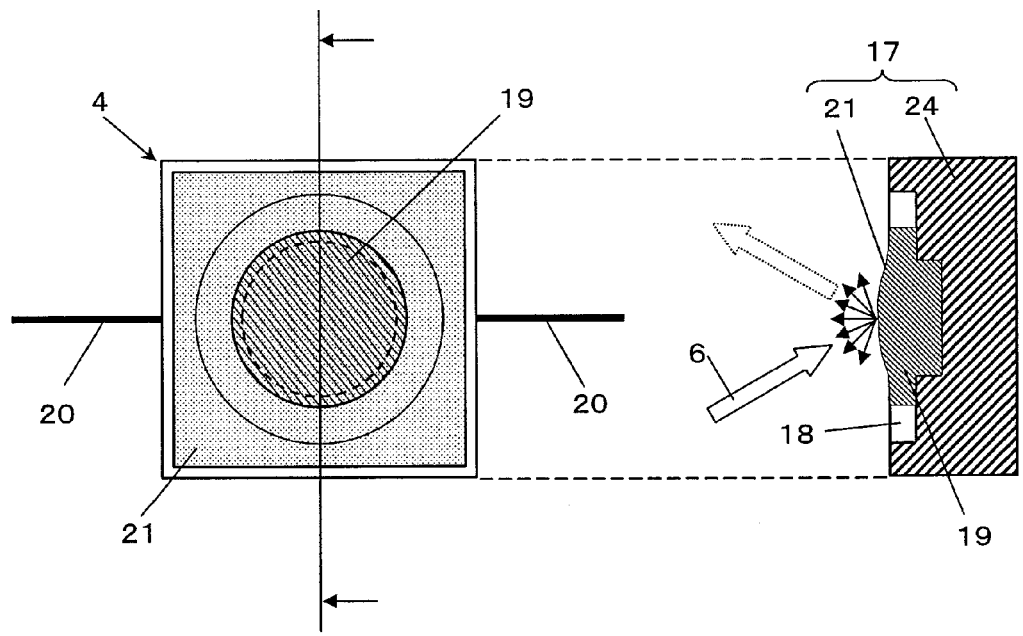

With reference to FIG. 10, a scan unit will be described in which a moving movable object 19 deforms a reflecting portion 21 to cause a change in the reflecting state (degree of scattering of reflected light) of the reflecting portion 21.

FIG. 10 is a diagram showing the scan unit 4 of the present embodiment. Each left-hand side diagram in FIG. 10 is a view showing the scan unit 4 from its reflection surface side, whereas each right-hand side diagram is a cross-sectional view of the scan unit 4. FIG. 10(a) shows the scan unit 4 when operating normally, whereas FIG. 10(b) shows the scan unit 4 when at halt.

In the example shown in FIG. 10, an enclosure portion 17 is formed by a base 24 and the reflecting portion 21. The base 24 and a reflecting portion 21 define a hollow portion 18 within the enclosure portion 17. The movable object 19 is enclosed in the hollow portion 18. A reflection surface of the reflecting portion 21 is positioned at the surface of the enclosure portion 17. The scan unit 4 of the present embodiment is also to be mounted in the image display apparatus 100 (FIG. 1). Laser light 6 entering the scan unit 4 is reflected by the reflecting portion 21 so as to be projected outside the image display apparatus 100.

The principle as to how the movable object 19 moves in accordance with the angular velocity of the scan unit 4 is as set forth in the description of Embodiment 1.

While performing a normal operation, the scan unit 4 is oscillating as shown in FIG. 10(a), with suspensions 20 serving as an axis. An inertial force (centrifugal force) which is generated in the outer peripheral direction of the hollow portion 18 due to the oscillation of the scan unit 4 acts on the movable object 19. As a result, the movable object 19 spreads in the outer peripheral direction of the hollow portion 18, so that the neighborhood of the center of the reflecting portion 21 has a sufficient planarity as a mirror for reflecting the laser light 6 to display an image.

While the scan unit 4 is performing an abnormal operation, e.g., when the scan unit 4 has come to a halt, the movable object 19 having spread towards the outer periphery of the hollow portions 18 gathers near the center as shown in FIG. 10(b), and the reflecting portion 21 is pushed up by the movable object 19 and deforms, thus resulting in a lower planarity. For example, the reflecting portion 21 assumes a convex surface. The laser light 6 reflected from the reflection surface, which now is a convex surface, becomes divergent light, so that the energy density of the laser light 6 is lowered.

Thus, the movable object 19 moves in accordance with the angular velocity of the scan unit 4, and deforms the reflecting portion 21. In accordance with the deformation of the reflecting portion 21, the degree of scattering of reflected light from the reflecting portion 21 changes. The movable object 19 moves in the direction of decreasing the degree of scattering as the angular velocity increases, and moves in the direction of increasing the degree of scattering as the angular velocity decreases. When the scan unit 4 comes to a halt, the movable object 19 moves in the direction of increasing the degree of scattering. For the reason set forth in the description of Embodiment 1, it is desirable that the movable object 19 moves within 0.25 seconds after the scan unit 4 comes to a halt. By adopting constructions set forth in the description of Embodiment 1 for the scan unit 4, it becomes possible to allow the movable object 19 to move within 0.25 seconds after the scan unit 4 comes to a halt.

In order for the reflecting portion 21 to deform with the movement of the movable object 19, the reflecting portion 21 must be sufficiently thin. For example, the reflecting portion 21 is composed of a thin aluminum film, which is used as a material that efficiently reflects visible light. Other than aluminum, it is also possible to use gold, silver, or the like as the material of the reflecting portion 21. In accordance with the light source used (wavelength band used), a dielectric film may be used as the reflecting portion 21.

A stepped structure is presented by the neighborhood of the center of the hollow portion 18 and the neighborhood of the outer periphery, such that the distance between the reflecting portion 21 and the base 24 is shorter near the outer periphery of the hollow portion 18, and that the distance between the reflecting portion 21 and the base 24 is longer near the center of the hollow portion 18. Because of this stepped structure, the movable object 19 maintains a state of having gathered near the center. In the case where the movable object 19 is hydrophilic, it is desirable to use a hydrophilic metal film for the reflecting portion 21 and use a hydrophobic material such as silicon for the base 24.

In the case where the movable object 19 is a liquid containing a magnetic substance, the neighborhood of the center of the reflecting portion 21 or the surface of the base 24 where it opposes the neighborhood of this center may be coated with a material for generating a magnetic force, and this magnetic force may allow the movable object 19 to maintain a state of having gathered near the center of the hollow portion 18.

Thus, according to the present embodiment, when the scan unit 4 comes to a halt, the reflecting portion 21 is pushed up by the movable object 19, and the reflecting portion 21 lowers in planarity to assume a convex surface, so that the laser light 6 reflected by this convex surface becomes divergent light. As a result, the energy density of the laser light 6 is lowered.

Other than the case where the scan unit 4 oscillating at a desired frequency comes to a halt, the angular velocity of the scan unit 4 may decrease. In such a case, too, the movable object 19 is able to move near the center of the hollow portion 18 in accordance with the angular velocity of the scan unit 4.

Figure 12:
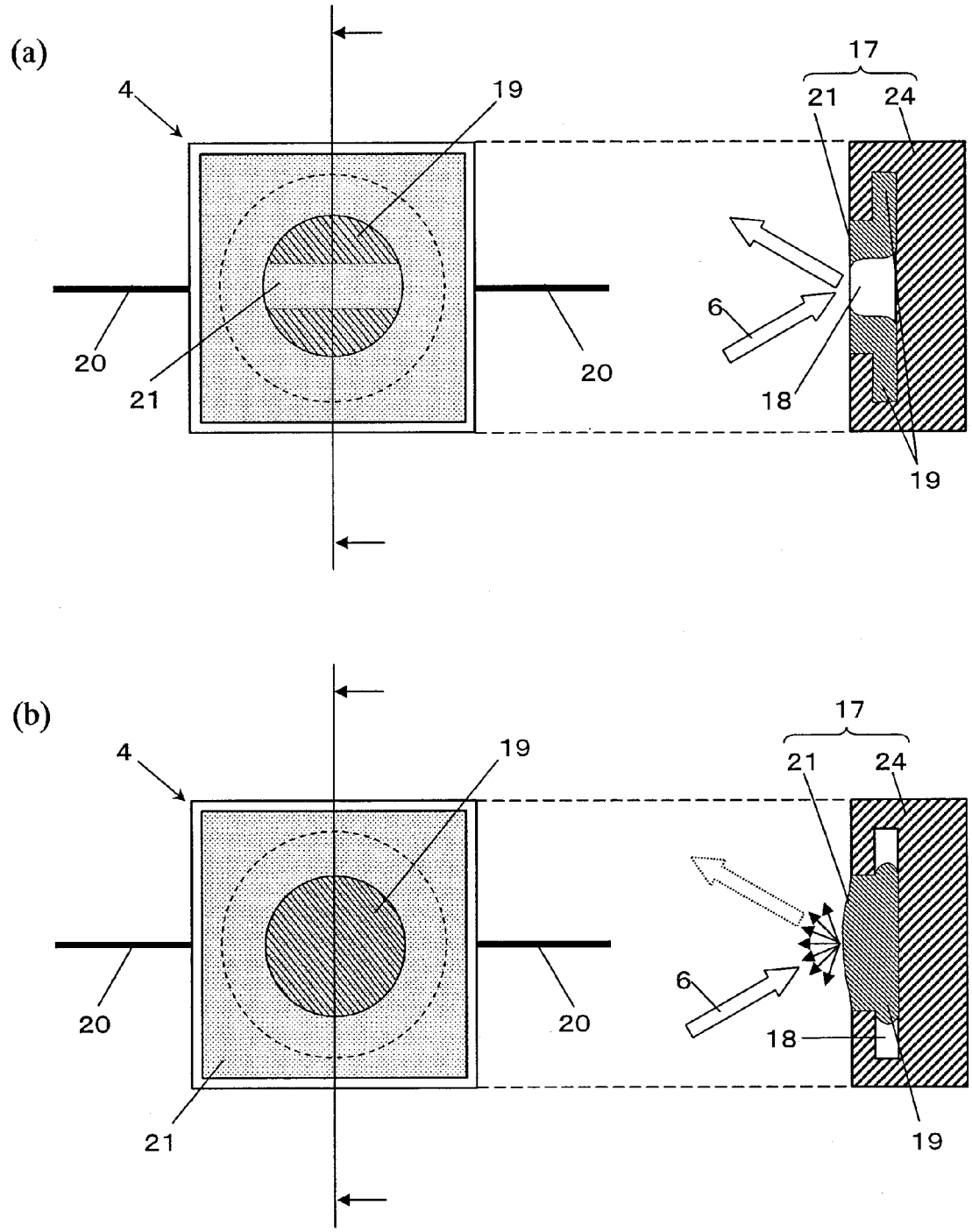
FIG. 12 (a) is a diagram showing a scan unit according to an embodiment of the present invention, as well as a state of a movable object when the scan unit is operating normally. (b) is a diagram showing a scan unit according to an embodiment of the present invention, as well as a state of a movable object when the scan unit is at halt.

The stepped structure between the neighborhood of the center of the hollow portion 18 and the neighborhood of the outer periphery may be a stepped structure as shown in FIG. 12. Each left-hand side diagram in FIG. 12 is a view showing the scan unit 4 from its reflection surface side, whereas each right-hand side diagram is a cross-sectional view of the scan unit 4. FIG. 12(a) shows the scan unit 4 when operating normally, whereas FIG. 12(b) shows the scan unit 4 when at halt. In the example shown in FIG. 12, the side wall of the base 24 at the inner surface side is recessed in the outer peripheral direction, and this recessed region (the region surrounded by the base 24) defines the outer periphery of the hollow portion 18.

Figure 11:
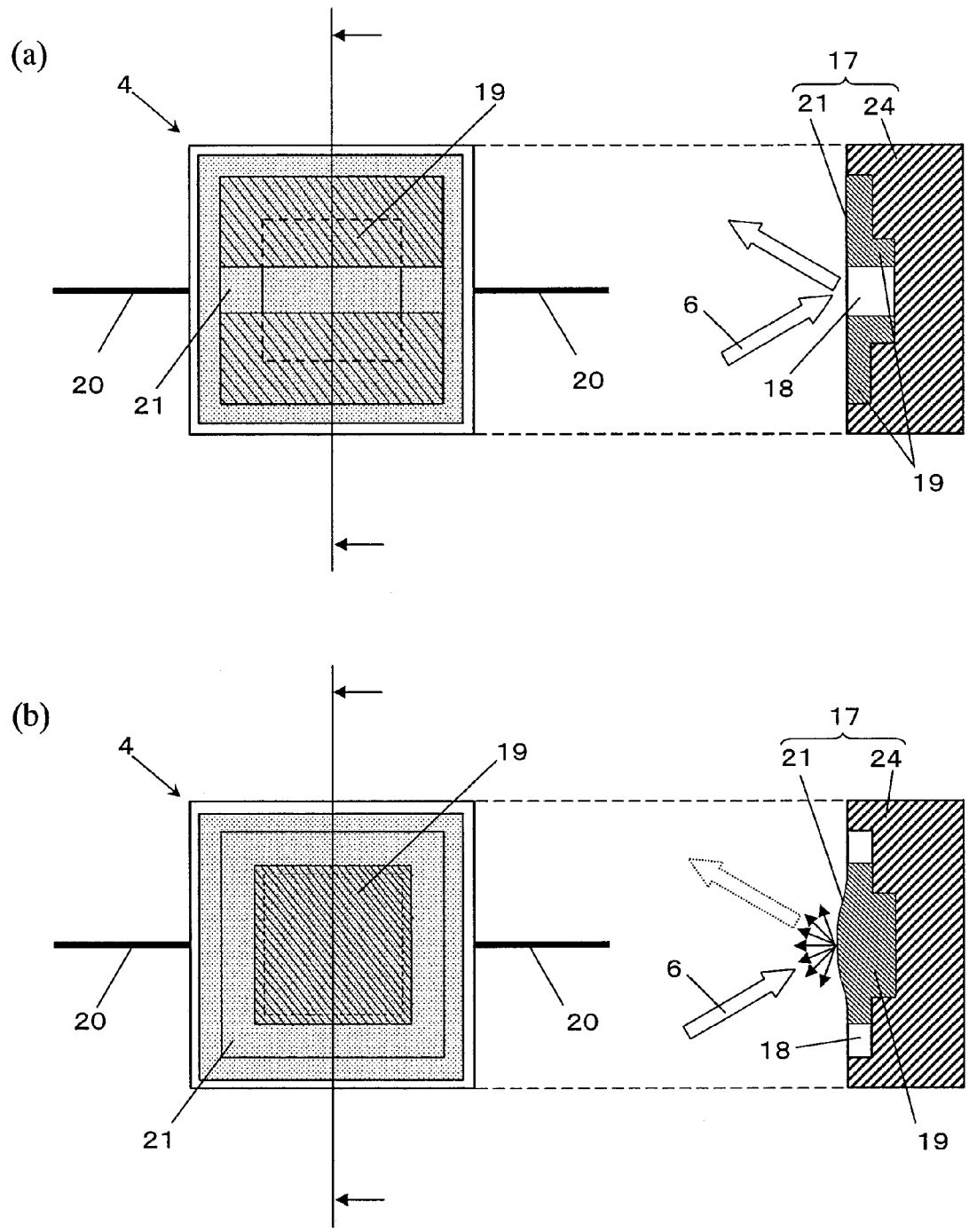
FIG. 11 (a) is a diagram showing a scan unit according to an embodiment of the present invention, as well as a state of a movable object when the scan unit is operating normally. (b) is a diagram showing a scan unit according to an embodiment of the present invention, as well as a state of a movable object when the scan unit is at halt.

As for the shape of the hollow portion 18, other than the stepped cylindrical shapes shown in FIG. 10 and FIG. 12, a quadrangular stepped prismatic shape shown in FIG. 11, a polygonal stepped prismatic shape, or a stepped shape which combines a cylindrical shape and a polygonal prismatic shape may be adopted. Each left-hand side diagram in FIG. 11 is a view showing the scan unit 4 from its reflection surface side, whereas each right-hand side diagram is a cross-sectional view of the scan unit 4. FIG. 11(a) shows the scan unit 4 when operating normally, whereas FIG. 11(b) shows the scan unit 4 when at halt.

In the case where the movable object 19 is a liquid containing charged particles, a transparent electrode 23 may be provided in the reflecting portion 21 as shown in FIG. 8, and a voltage may be applied to the transparent electrode 23 in order for the movable object 19 to maintain a state of having gathered near the center of the hollow portion 18.

Other than the quadrangles shown in FIG. 10 to FIG. 12, the shape of the reflecting portion 21 may be a polygon or a circle. Moreover, the reflecting portion 21 may be provided on the entire surface of the base 24 on which the reflecting portion 21 is formed.

In order to ensure that the movable object 19 will maintain a state of having gathered near the center of the hollow portion 18 regardless of the orientation of the scan unit 4 when the scan unit 4 comes to a halt, the combination of the structure of the hollow portion 18 and the volume of the movable object 19 to be enclosed in the hollow portion 18 is adjusted.

In the case where the movable object 19 contains a magnetic substance or charged particles, or where the movable object 19 is a magnetic substance or charged particles alone, as a method of causing a move in the outer peripheral direction of the hollow portion 18, the outer periphery side of the base 24 and/or the transmitting portion 22 may be coated with a material for generating a magnetic force, or an electrode for voltage application may be provided therein.

Depending on the material surrounding the hollow portion 18 and the material of the reflecting portion 21, an inert liquid may be used as the movable object 19. As a gas to be enclosed in the hollow portion 18, an inert gas may be used, depending on the material surrounding the hollow portion 18 and the material of the reflecting portion 21.

Depending on the material surrounding the hollow portion 18, the material of the reflecting portion 21, and the material of the movable object 19, the gas which is enclosed in the hollow portion 18 may be withdrawn by a vacuum pump or the like (i.e., so as to lower the pneumatic pressure).

In order to enhance the hydrophobicity of the base 24 and the region of the reflecting portion 21 surrounding the hollow portion 18, a hydrophobic treatment or water-repellent coating may be performed. In the field of micromachining technology, treatment apparatuses which are capable of a hydrophobic treatment or water-repellent coating are also provided.

Although a laser light source is used as a light source in the present embodiment, the present embodiment can also be used as safety measures of an image display apparatus in which a white light source such as a halogen lamp is used.

Figure 13:
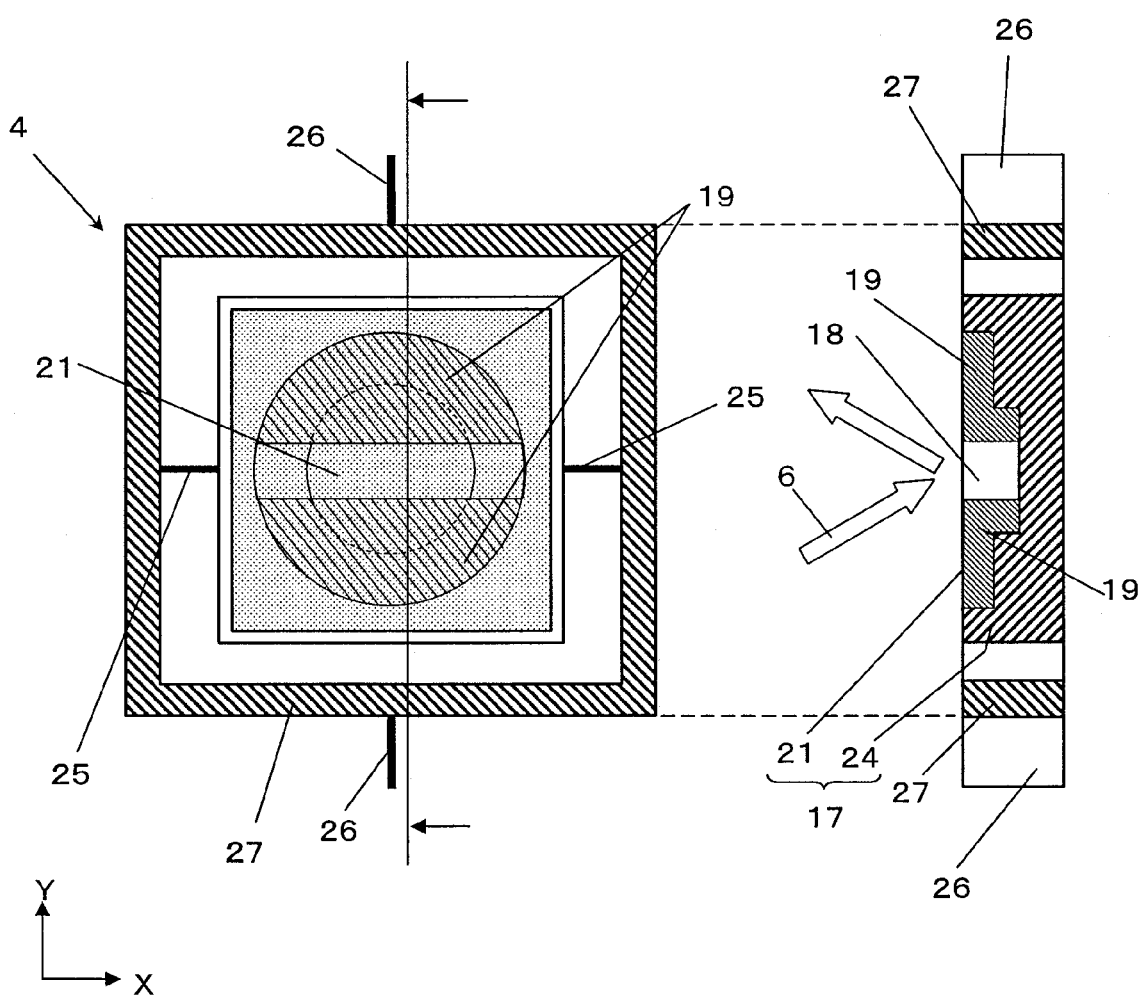
FIG. 13 A diagram showing a scan unit according to an embodiment of the present invention as a bi-axial pivoting scan mirror device.

FIG. 1 illustrates a scanning-based image display apparatus 100 in which two scan mirror devices of a one-dimensional scanning approach are used as the scan units 4. It is desirable that the aforementioned construction in which the reflecting portion 21 is deformed by the movable object 19 is applied to both of the two scan units 4. Moreover, a scan mirror device of a two-dimensional scanning approach as shown in FIG. 13 may be used as scan unit 4. The present invention is also applicable as safety measures for an image display apparatus in which a scan mirror device(s) of a two-dimensional scanning approach is used.

With reference to FIG. 13, a scan unit 4 which is a bi-axial pivoting scan mirror device includes: x-axis suspensions 25 for allowing a base 24 to pivot around an x axis; an intermediate frame 27 for supporting the base 24 via the x-axis suspensions 25; and y-axis suspensions 26 for allowing the base 24 and the intermediate frame 27 to pivot around a y axis. One end of each x-axis suspension 25 is connected to the base 24; the other end of each x-axis suspension 25 is connected to the intermediate frame 27. One end of each y-axis suspensions 26 is connected to the intermediate frame 27; the other end of each y-axis suspensions 26 is affixed to a stationary frame (not shown). With such a bi-axial pivoting scan mirror device, effects similar to the effects of the present invention as described with reference to FIG. 10 to FIG. 12 are obtained.

INDUSTRIAL APPLICABILITY

The present invention is particularly useful in the technological field of displaying images by projecting laser light, and provides an image display apparatus which is safe and which can perform display with an adequate brightness, while realizing downsizing and cost reduction of the image display apparatus.

The invention claimed is:

1. A scan unit comprising:
   a reflecting portion for reflecting laser light; and
   an enclosure portion having a movable object enclosed within a hollow, wherein,
   the movable object has flowability,
   the movable object moves in accordance with an angular velocity of the scan unit, thereby changing a reflecting state of the reflecting portion with respect to the laser light, and
   the movable object is liquid, powder or a mixture of liquid and powder.

2. The scan unit of claim 1, wherein,
   at least a part of the enclosure portion is positioned near a surface of the reflecting portion that reflects the laser light; and
   the movable object moves in accordance with the angular velocity of the scan unit to cover at least a part of the reflecting portion.

3. The scan unit of claim 2, wherein,
   the reflecting portion is provided on an inner surface of the enclosure portion;
   the enclosure portion includes a transmitting portion for transmitting the laser light, the transmitting portion opposing the reflecting portion; and
   the movable object moves in between the reflecting portion and the transmitting portion.

4. The scan unit of claim 2, wherein,
   the movable object moves in a direction of covering a smaller proportion of the reflecting portion as the angular velocity increases, and moves in a direction of covering a larger proportion of the reflecting portion as the angular velocity decreases; and
   a reflected light amount from the reflecting portion is smaller when the proportion of covering the reflecting portion is large than when the proportion of covering the reflecting portion is small.

5. The scan unit of claim 2, wherein,
   the movable object moves in a direction of covering a larger proportion of the reflecting portion when the scan unit comes to a halt; and
   a reflected light amount from the reflecting portion decreases when the movable object moves in the direction of covering a larger proportion of the reflecting portion.

6. The scan unit of claim 5, wherein the movable object moves within 0.25 seconds after the scan unit comes to a halt.

7. The scan unit of claim 1, wherein,
   the reflecting portion is provided on the enclosure portion; and
   the movable object moves in accordance with an angular velocity of the scan unit to deform the reflecting portion.

8. The scan unit of claim 7, wherein,
   a degree of scattering of reflected light from the reflecting portion changes in accordance with deformation of the reflecting portion; and
   the movable object moves in a direction of decreasing the degree of scattering as the angular velocity increases, and moves in a direction of increasing the degree of scattering as the angular velocity decreases.

9. The scan unit of claim 7, wherein,
   a degree of scattering of reflected light from the reflecting portion changes in accordance with deformation of the reflecting portion; and
   the movable object moves in a direction of increasing the degree of scattering when the scan unit comes to a halt.

10. The scan unit of claim 9, wherein the movable object moves within 0.25 seconds after the scan unit comes to a halt.

11. An image display apparatus comprising:
    the scan unit of claim 1;
    a light source for outputting the laser light; and
    a driving section for driving the scan unit, wherein,
    the image display apparatus displays an image with at least a part of the laser light reflected by the scan unit and projected; and
    the state of the projected laser light changes in accordance with a movement of the movable object.

* * * * *